No. 770,832. PATENTED SEPT. 27, 1904.
J. P. TAYLOR.
APPARATUS FOR MAKING SHEET GLASS.
APPLICATION FILED APR. 16, 1903.
NO MODEL.
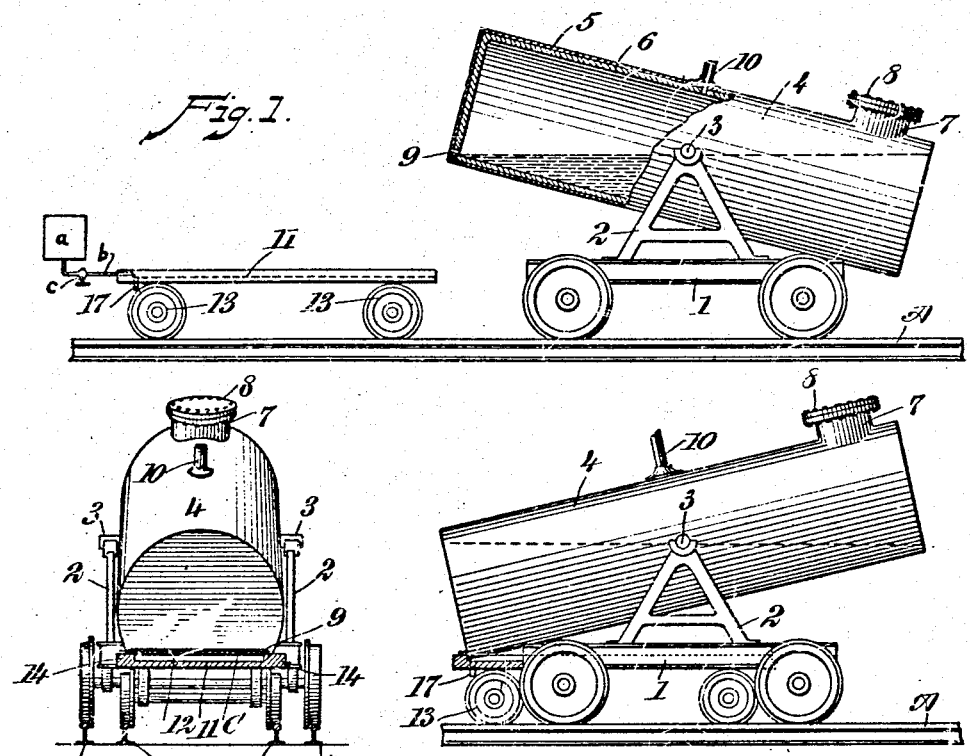
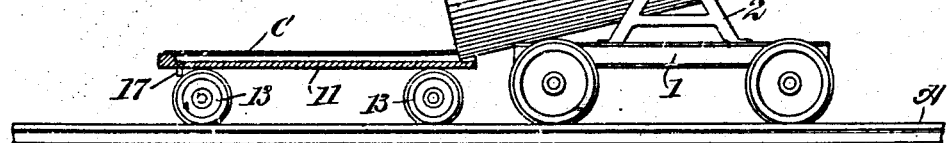
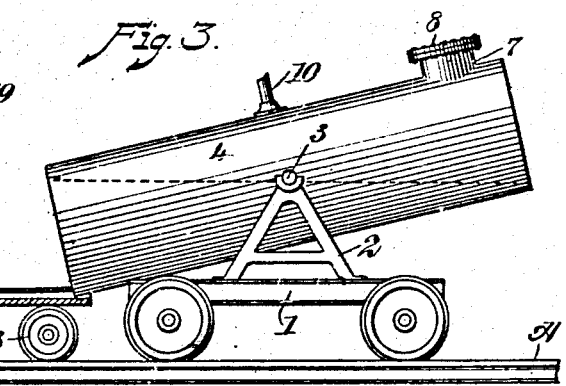
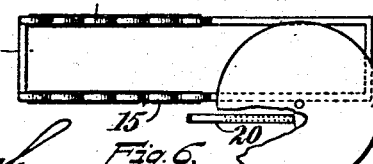
WITNESSES:
Robert Head
R. B. Cavanagh
INVENTOR
John P. Taylor
BY Munn
ATTORNEYS.

No. 770,832. Patented September 27, 1904.

UNITED STATES PATENT OFFICE.

JOHN P. TAYLOR, OF CICERO, INDIANA.

APPARATUS FOR MAKING SHEET-GLASS.

SPECIFICATION forming part of Letters Patent No. 770,832, dated September 27, 1904.

Application filed April 16, 1903. Serial No. 152,885. (No model.)

*To all whom it may concern:*

Be it known that I, JOHN P. TAYLOR, a citizen of the United States, and a resident of Cicero, in the county of Hamilton and State of Indiana, have invented new and useful Improvements in Apparatus for Making Sheet-Glass, of which the following is a full, clear, and exact description.

This invention relates to certain novel and useful improvements in an apparatus for making or forming sheet-glass.

In carrying out the present invention I have particularly in view an apparatus for forming the glass sheet so that both sides of the latter will be polished to the same degree.

A further object of the invention is to provide means whereby the molten glass may be easily and readily conveyed to and deposited on or in a novel form of table or carriage arranged adjacent to the receptacle carrying the molten glass.

A further object of my invention is to force the molten or liquid glass from the receptacle through the medium of a charge of air or steam or any gas, and I have further in view means for forming a cushion of air or steam in the receptacle or table for the sheet, such molten-sheet of glass being supported in its formation by the cushion of air, steam, or any suitable gas or vapor.

With these and other objects of a similar nature in view the invention consists in the combination, construction and arrangement of parts, as is described in this specification, delineated in the accompanying drawings, and set forth in the appended claims.

Reference is to be had to the accompanying drawings, forming a part of this specification, in which similar characters of reference indicate corresponding parts in all the figures.

Figure 1 is a view in side elevation of a glass-table and a tank or receptacle containing the molten glass to be conveyed to the table, a portion of said receptacle being broken away to show the interior thereof. Fig. 2 is a front view of said receptacle and table, said table for the sheet-glass being mounted upon the carriage, the body or box of the table being shown in transverse section. Fig. 3 is a view in side elevation of said tank or receptacle, showing it tilted to pour the molten glass upon the table, a portion of said table being shown in section. Fig. 4 is a view showing the same parts in a different relative position, the table being shown in vertical longitudinal section, while the receptacle is shown in elevation. Fig. 5 is a view in side elevation, showing the rollers and a relatively large revolving disk or plate mounted above the truck or carriage for maintaining the glass sheet level while cooling; and Fig. 6 is a top view thereof. Fig. 7 is a face view of the front of the receptacle.

Referring now to the accompanying drawings in detail, 1 designates a wheeled truck or carriage adapted to run upon the tracks A, such truck being provided with upwardly-extending parallel standards 2 2, which standards are adapted to support the trunnions 3 3, formed in the sides of the cylindrical molten-glass-receiving tank 4. This tank may be of any desired shape or form; but I prefer to have the same of cylindrical form, the shell 5 of said tank being formed of metal, the inside of said shell being lined, as at 6, with a refractory substance, such as a clay of the sort generally used for making glass-melting pots and the like. The upper portion of the receptacle or tank is formed with an opening or entrance 7, having a cover 8 fitted thereto, which cover is adapted to render the said opening air-tight. Glass is run from the spout in the side or end of the melting-tank through this entrance or opening into the receptacle, while at the opposite or lower end of the tank is formed a slot or transversely-elongated opening 9, through which the molten glass is adapted to pass upon the carriage or table. This elongated opening is preferably of a width equal to the width of the sheet of glass it is desired to form, and the molten compound is forced from the tank when it is tilted to the positions shown in Figs. 2, 3, and 4 through the medium of air, gas, or steam admitted under pressure into said tank through the entrance-port 10.

The table for the glass sheet is designated as a whole by the numeral 11 and comprises a flat box-like portion having a bed 12 formed therein, approximately equal to the dimensions of the desired sheet of glass. This table is mounted upon a wheeled truck the wheels 13 of which are adapted to run upon rails B, extending parallel to and between the tracks A, the distance between the rails B being, of course, less than the distance between the tracks A, and as the truck is correspondingly narrower than the truck carrying the receptacle the table may run up to the truck 1 and directly beneath the receptacle 4. If desired, a train of trucks for tables may be employed instead of a single one, and it will also be understood that a plurality of trucks 1 and receptacles 4 may be used. The flanges 14 14 formed on the table are adapted to receive the glass as it is poured or forced from the receptacle, the sheet of glass being sustained and prevented from falling into the bottom of the table through the medium of a cushion of air, gas, or steam, which is passed under the glass and fills the bed of the table. The gas, steam, or air may be conveyed to the bed from any suitable source of supply, one example of which is shown at the left in Fig. 1, comprising a storage-tank $a$ and a duct $b$, communicating with the table, said duct having a valve $c$. The fluid is maintained at a sufficient pressure so that the force exerted by the same will not bulge or cause bubbles to form in the sheet of glass, yet will be sufficient to prevent the sheet falling upon the bed. To insure that the sheet of glass, which I have shown at C, will be held in contact with the flanges, I employ a series of rollers, as at 15, journaled in a frame 16, suspended above the truck or carriage in any suitable manner (not shown) for the table, such rollers being designed to pass lightly over the edges of the glass sheet reposing on the flanges, thereby preventing the air escaping by forcing the sheet up from the flanges, for, as will be evident, should the air forming the cushion escape the semiliquid sheet would drop into the bed of the table and be spoiled. This is prevented by the rollers 15 bearing on the edges of the glass shell resting on the flanges. Any excess of pressure of the cushion of air or gas is relieved through the medium of an exhaust-valve 17, communicating with the bed of the table.

Revolubly mounted upon a spindle 18, arranged alongside the track, is a wheel or disk 19, under which disk the carriage or table travels, and said disk is adapted, when the carriage is moved to a position thereunder, to extend over the sheet of glass being formed. The under surface of this disk is coated with a non-heat-conducting material, such under side, while the disk is revolving, being sprayed with water from a perforated pipe 20. The heat rising from the surface of the glass will convert the liquid on the disk into steam, the result being that a film or coating of steam is formed above the sheet. As air or steam is admitted to the bed of the table or carriage while the glass is being formed, the sheet will be pressed upward into contact with the under side of the disk, which will preserve the levelness of the sheet, the film of steam preventing direct contact with the material of the disk, while the rollers 15 will hold the edges of the sheet firmly on the flanges of the table.

From the above description, taken in connection with the accompanying drawings, the use and advantages of my improvements will be readily apparent. The glass-containing tank and the table or carriage for the glass are moved relative to each other until the two occupy the position shown in Fig. 3—that is to say, the table or carriage extends beneath the receptacle, and when the latter is tilted the open or mouth end of the same rests at the forward end of the table. When the carriage is drawn away from the table, such a movement causes to be deposited upon the latter the amount of glass necessary to form a sheet of the required size. After this operation the table is moved to a position beneath the rollers, and the latter, in conjunction with the disk, operate to form the sheet, as hereinbefore described. The formation of indentations or flaws on the sheet of glass is avoided, and a sheet approximately level is quickly made, as the rollers acting on the edges of the sheet and the disk extending over the main body of the said sheet tend to preserve the smoothness and levelness of the same. The end edges of the glass sheet may then be held upon the table in any desired manner. (Not shown.)

While I have shown and herein described one particular embodiment of my invention, it is of course to be understood that I do not limit myself to the precise details of construction shown herein, as there may be modifications and variations in certain respects without departing from the essential feature of the invention or sacrificing any of the advantages thereof.

Having thus described my invention, I claim as new and desire to secure by Letters Patent—

1. An apparatus of the class described, comprising a movable receptacle adapted to contain molten glass, a table arranged adjacent thereto, means for forcing the glass under pressure from the receptacle upon the table, and means for causing the formation of a fluid cushion to sustain the glass upon said table, substantially as set forth.

2. An apparatus of the class described, comprising a movable, tilting receptacle adapted to contain molten glass or the like, a table arranged adjacent thereto, means for forcing the molten glass under pressure from the receptacle upon the table, and means for causing the formation of a fluid cushion on the table for said glass, substantially as set forth.

3. An apparatus of the class described, comprising a receptacle adapted to contain molten glass or the like, a table arranged adjacent thereto, means for forcing the molten glass from the receptacle to the table, means for causing the formation of a fluid cushion for the glass upon the table beneath the glass sheet, and pressure-rollers adapted to pass over the edges of the glass sheet to hold the latter in contact with the table, substantially as set forth.

4. An apparatus of the class described, comprising a receptacle adapted to contain molten glass, a wheeled truck supporting the same, a table for forming the glass sheet, a wheeled truck supporting said table, whereby the latter may be moved into a position adjacent to said tank, said table having a bed formed therein, an inlet in the tank for the molten glass, an outlet therefor, means for forcing the molten glass from the receptacle to the table under fluid-pressure, means for forming a fluid cushion on the bed of the table for sustaining the glass sheet, and pressure-rollers passing over the edges of the glass sheet to hold the sheet on the table, substantially as set forth.

5. An apparatus of the class described, comprising a receptacle adapted to contain molten glass, a table for forming the glass sheet, such table having flanges upon which the sheet rests during formation, rollers arranged above the flanges for holding the sheets in contact with the latter, and a disk mounted to revolve above said table, substantially as set forth.

6. An apparatus of the class described, comprising a receptacle adapted to contain molten glass, a table for forming the glass sheet, such table having flanges upon which the sheet is adapted to rest during formation, a disk mounted to revolve above said table, the under surface of said disk being coated with a non-conducting material, and means for spraying the under surface of the disk with a fluid, the construction being such that a film of steam will be formed between the glass and the disk, substantially as set forth.

In testimony whereof I have signed my name to this specification in the presence of two subscribing witnesses.

JOHN P. TAYLOR.

Witnesses:
IRA E. BENNETT,
F. A. MITCHELL.